F. B. STORK.
TRACTION WHEEL.
APPLICATION FILED MAY 19, 1920.
1,373,536.
Patented Apr. 5, 1921.
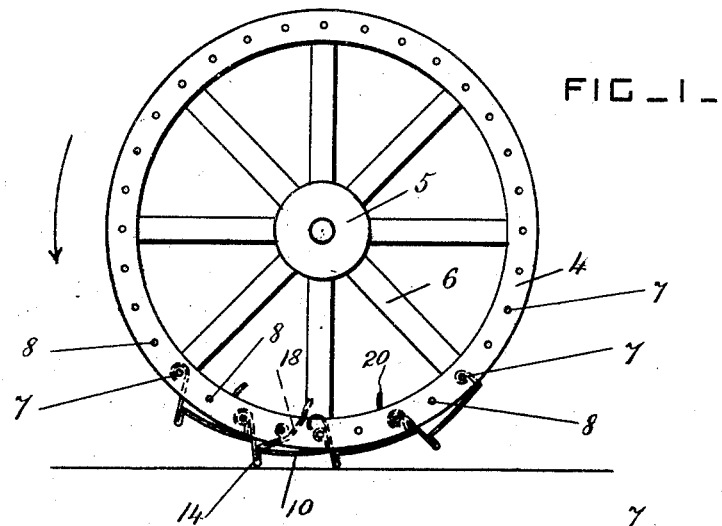
FIG_1_
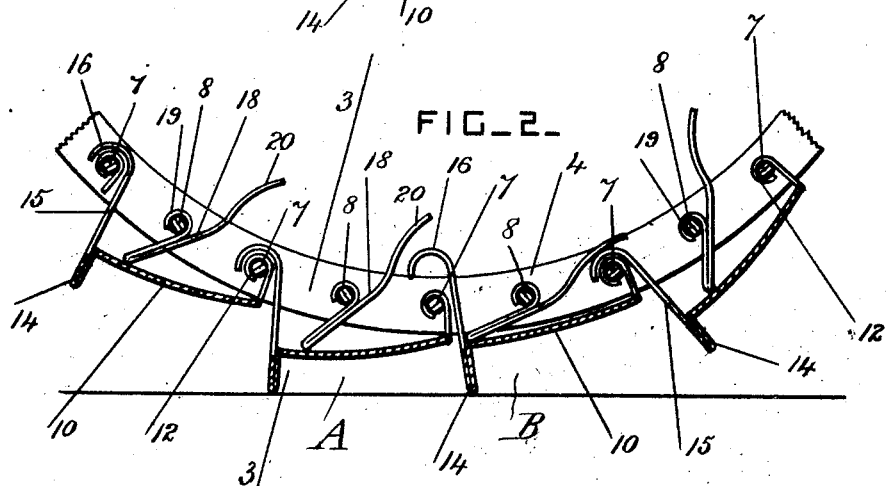
FIG_2_
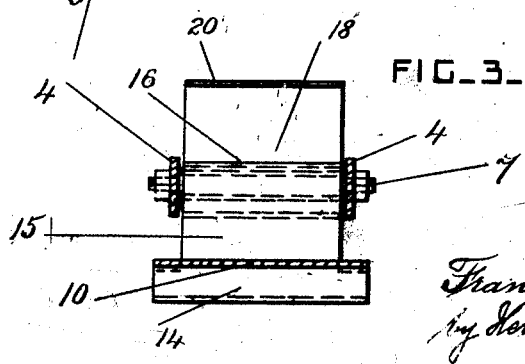
FIG_3_
Inventor.
Franklin B. Stork.
by Herbert W. Jenner.
Attorney

UNITED STATES PATENT OFFICE.

FRANKLIN B. STORK, OF ROCK ISLAND, ILLINOIS.

TRACTION-WHEEL.

1,373,536.   Specification of Letters Patent.   Patented Apr. 5, 1921.

Application filed May 19, 1920. Serial No. 382,588.

*To all whom it may concern:*

Be it known that I, FRANKLIN B. STORK, a citizen of the United States, residing at Rock Island, in the county of Rock Island and State of Illinois, have invented certain new and useful Improvements in Traction-Wheels, of which the following is a specification.

This invention relates to traction ground wheels for traction engines and other similar machines; and it consists in the novel construction and combination of the parts hereinafter fully described and claimed.

The principal object of this invention is to provide a traction wheel with movable spurs for engaging positively with the ground, said spurs being moved automatically as the machine moves over the ground so that their period of engagement with the ground is lengthened and the tractive power of the wheel is thereby increased.

In the drawings, Figure 1 is a side view of portions of a traction wheel constructed according to this invention. Fig. 2 is a longitudinal section through a portion of the wheel drawn to a larger scale. Fig. 3 is a cross-section, taken on the line 3—3 in Fig. 2.

The traction wheel is provided with two spaced side plates 4, a hub 5 and spokes 6, the hub and spokes being of any approved construction. The side plates 4 are spaced apart by pins or bolts 7 and 8, or by any other approved means. The pins 7 and 8 are arranged alternately, and are similar to each other. Traction plates 10 are provided, and have at one end eyes or sleeves 12 which are pivoted on the pins 7 between the side plates. The traction plates 10 overlap the side plates, and are normally arranged substantially at a tangent to the periphery of the wheel, and they have radially and outwardly projecting spurs 14 at their free ends for engaging with the ground.

Tongues 15 project inwardly from the spurs, and are narrower than the space between the side plates, and they terminate in hooks 16 which overlap the pins 7 adjacent to the pins 8 to which the traction plates to which they pertain are pivoted. The pivot eyes 12 are arranged in advance of the hooks 16 in the direction of the curved arrow in Fig. 1. The pins 7 limit the movement of the traction plates in one direction.

Lever plates 18 are pivoted by eyes or sleeves 19 on the pins 8, between the pins 7. The lever plates are pivoted at their middle parts, and their front end portions project under the free end portions of the traction plates. The rear end portions 20 of the lever plates are longer than their front end portions, and they project over the hook-shaped ends 16 of the tongues 15 of the traction plates next behind them in the series.

When the wheel is revolved in the direction of the curved arrow in Fig. 1, it is moved horizontally to the left, and when a plate 10 arrives at the position A in Fig. 2 the spur is pressed toward the axis of the wheel by contact with the ground until it arrives at the position B. When the plate at A moves inwardly it turns the lever plate 18 pertaining to it pivotally, and thereby forces the plate at B outwardly so that its period of engagement with the ground is increased.

This action of the traction plates one after another enables the traction wheel to engage positively with the ground, so that the wheel cannot slip in driving, and it enables the traction engine to draw a very heavy load. When the traction plates are pressed inwardly of their normal tangential position, their overlapping side portions rest on the peripheries of the side plates, and are substantially concentric with the wheel.

What I claim is:

1. In a traction wheel, spaced side plates, traction plates pivoted between the side plates and provided with outwardly projecting spurs, and lever devices also pivoted between the side plates and arranged alternately of the traction plates, each lever device engaging with two traction plates so that the spurs are projected one after another at the lower side of the wheel.

2. In a traction wheel, a series of traction plates provided with outwardly projecting spurs and pivoted around the periphery of the wheel, and a series of operating devices arranged alternately of the traction plates and supported by the wheel, each operating device engaging with two traction plates, so that the spurs are projected one after another at the lower side of the wheel.

3. In a traction wheel, spaced side plates, traction plates pivoted between the side plates and having side portions which overlap the side plates, said traction plates having also outwardly projecting spurs, and lever devices also pivoted between the side plates and arranged alternately of the traction plates and operating to press their spurs outwardly one after another.

4. In a traction wheel, spaced side plates, pins extending between the side plates, traction plates pivoted at one end on alternate pins and provided at their free ends with outwardly projecting spurs, and lever devices having their middle parts pivoted on the intervening pins and engaging operatively with the traction plates next in front of them and next behind them, and operating to press the spurs outwardly one after another.

5. In a traction wheel, spaced side plates, traction plates pivoted at one end between the side plates and having at their free ends outwardly projecting spurs and inwardly projecting tongues, and lever plates arranged alternately of the traction plates and having their middle parts pivoted between the side plates, each lever plate engaging with the free end portion of the traction plate next in front of it and with the tongue of the traction plate next behind it in the series.

In testimony whereof I have affixed my signature.

FRANKLIN B. STORK.